Figures 1, 2, 3, 4, 5:
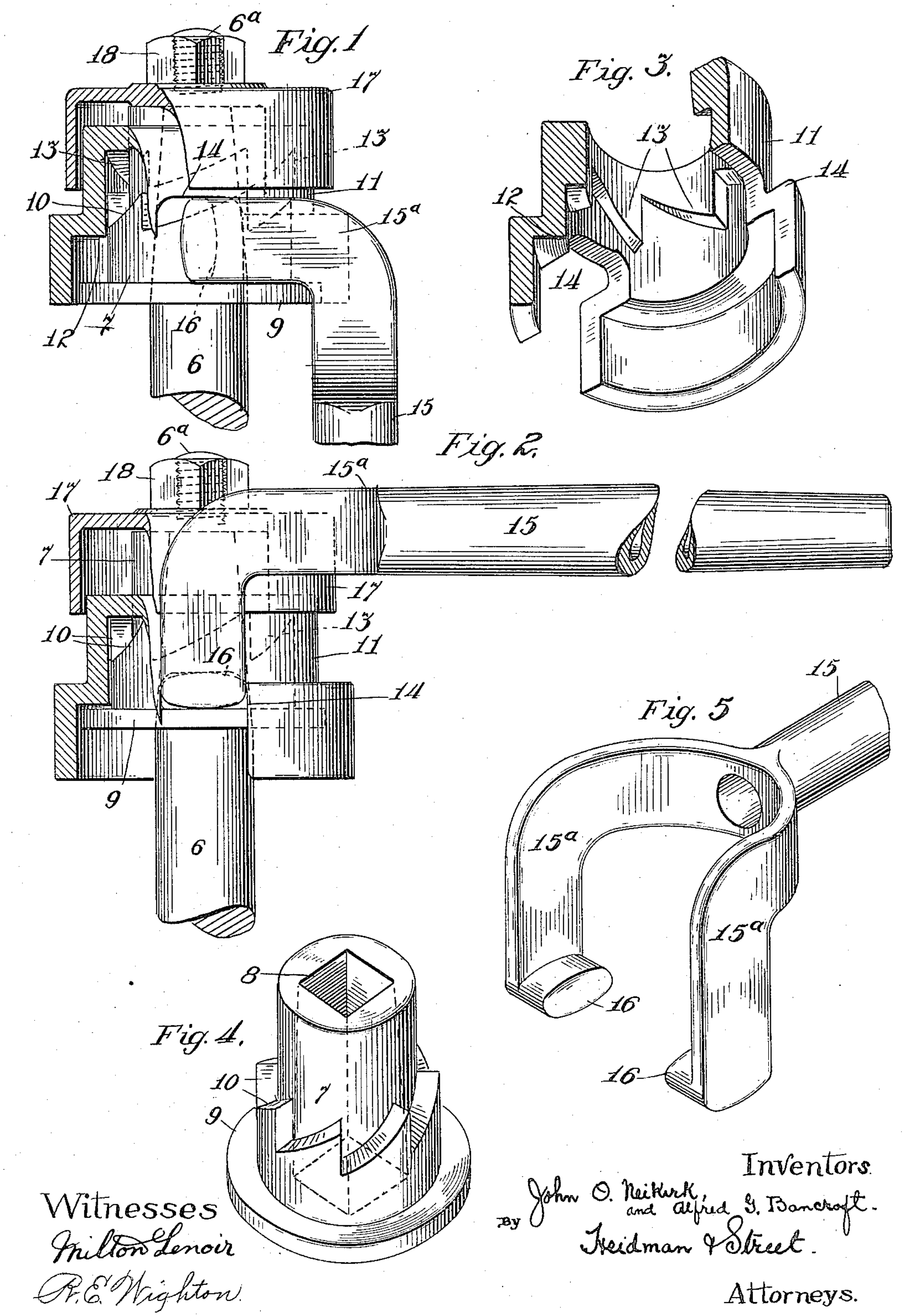

J. O. NEIKIRK & A. G. BANCROFT.
SHAFT OPERATING MECHANISM.
APPLICATION FILED AUG. 17, 1912.

1,166,073. Patented Dec. 28, 1915.

Witnesses
Milton Lenoir
R. E. Wighton

Inventors
John O. Neikirk, and Alfred G. Bancroft.
By Heidman & Street.
Attorneys.

COLUMBIA PLANOGRAPH CO., WASHINGTON, D. C.

UNITED STATES PATENT OFFICE.

JOHN O. NEIKIRK AND ALFRED G. BANCROFT, OF CHICAGO, ILLINOIS, ASSIGNORS TO HERCULES EQUIPMENT COMPANY, OF CHICAGO, ILLINOIS, A CORPORATION OF ILLINOIS.

SHAFT-OPERATING MECHANISM.

1,166,073. Specification of Letters Patent. Patented Dec. 28, 1915.

Application filed August 17, 1912. Serial No. 715,542.

*To all whom it may concern:*

Be it known that we, JOHN O. NEIKIRK and ALFRED G. BANCROFT, citizens of the United States, and residents of Chicago, in the county of Cook and State of Illinois, have invented certain new and useful Improvements in Shaft-Operating Mechanism, of which the following is a description, reference being had to the accompanying drawing, which forms a part of our specification.

Our invention relates to mechanism more especially adapted for use in the operation of the shaft or staff of hand operated brakes; the object being to provide mechanism which will automatically move into and out of operative relation without the use of springs or such parts which may readily become inoperative; the mechanism being composed of as few parts as possible, and at the same time efficient in operation, as will more fully appear from the following detailed description.

In the drawing:—Figure 1 illustrates our improved mechanism in elevation, with portions broken away and shown in section, in order to disclose the internal construction; the mechanism being shown in inoperative position. Fig. 2 is a similar view illustrating the mechanism in operative position. Fig. 3 is a sectional perspective view of one of the interlocking or ratchet members. Fig. 4 is a perspective view of the other ratchet or shaft engaging member. Fig. 5 is a perspective view of a portion of the hand lever of our shaft operating mechanism.

Our invention is more especially adapted for use in the operation of the shaft or staff of hand brakes of railway cars and the like, where compactness of the operating mechanism is a desideratum, and wherein the operating lever may drop or readily move into close proximity with the staff or shaft of the brake and out of the way as soon as the operator or brakeman releases the lever.

In the exemplification of our invention, 6 represents the shaft or staff of the brake operating mechanism, about the lower end of which the chain is usually wound. The upper end of the shaft 6 is preferably tapered and squared as shown in dotted lines, Figs. 1 and 2, in order to receive the sleeve portion or shaft engaging ratchet member 7, the construction whereof is more clearly set forth in Fig. 4. The sleeve portion 7 is provided with a tapering squared opening 8 passing therethrough in order to receive the tapered squared end of the shaft 6. If desired, of course, the sleeve portion or member 7 may be keyed or feathered on the shaft when the upper end thereof is not squared. The lower end of sleeve portion 7 is provided with an annular flange 9, while at a point intermediate of the ends of the sleeve, it is provided with a series of circumferentially arranged teeth 10 presented upwardly as clearly shown in Fig. 4. The member 7 is, of course, intended to rotate with the shaft.

Loosely mounted on the cylindrical portion of sleeve member 7 is a collar portion or interlocking member 11, which is preferably made of greater diameter at the lower portion thereof, being offset, as shown at 12, so that the lower end or skirt portion may extend about or encircle the flange 9 of sleeve member 7, as clearly shown in Figs. 1 and 2; the shoulder or off-set 12 being adapted to rest on or come into close proximity to the flange 9 of sleeve member 7 when the mechanism is in an interlocked or operative position, see Fig. 2. The smaller or upper end of collar portion 11 is provided with a circular opening to receive the cylindrical part of sleeve 7, and the interior surface of this smaller or reduced portion of collar 11 is provided with the circumferentially arranged and downwardly presented teeth 13, as can be more clearly seen in Fig. 3. The teeth 13 are so constructed as to interlock or engage with the teeth 10 of sleeve portion 7 when the mechanism is in operative position, as shown in Fig. 2. Collar 11 is provided with two cut-out portions as shown at 14, see Fig. 3, preferably arranged diametrically opposite each other; the cut-out portions being in the lower or flared portion of collar 11, as clearly shown.

15 represents a lever whereby the shaft is operated; the inner end of the lever being bifurcated and preferably given a substantially right angular bend at an intermediate point in the bifurcations, thus producing the portions $15^a$ which are adapted to extend to either side of the mechanism; the bifurcations $15^a$ being sufficiently spread or separated so as to extend about the enlarged or flaring skirt portion of the collar 11.

The free ends of the bifurcations $15^a$ are provided with the inwardly presented portions or lugs 16 which are adapted to extend into the cut away portions 14 of collar 11 and rest upon the flange 9 of sleeve portion 7. The lugs 16 are of greater dimensions in a direction transversely of the bifurcations than vertically when the lever is held as shown in Fig. 5; the length of the lugs being substantially equal to or slightly greater than the distance from the flange 9 to the tips of the teeth 10 on sleeve portion 7; while the width or thickness of the lugs, namely the vertical dimensions of the portions when the lever is in the position shown in Figs. 2 and 5, is preferably less than the distance between the flange 9 and the lowest point of the teeth engaging portion of sleeve 7. The cut-out portions 14 are preferably made to extend to a point slightly below or in proximity to the tips of the teeth 13 in collar 11.

It is apparent from the construction shown and described that when the lever 15 is raised to the position shown in Fig. 2, thereby moving the portions or lugs 16 so as to present their length in a horizontal direction as shown in Fig. 5, the collar portion 11 will be permitted to drop downward over sleeve portion 7, by reason of the cut-out portions 14, into the position shown in Fig. 2, and allow the teeth 13 of collar 11 to engage with the teeth 10 of sleeve portion 7.

With the engaging portions or teeth of collar 11 interlocked with the engaging portions or teeth of sleeve portion 7, it is evident that the horizontal swing or movement of lever 15 in one direction will compel collar 11 to rotate sleeve portion 7 and with it shaft or staff 6, because the ends of lugs 16 will engage with the side walls of the cut-out portions 14 in collar 11 and compel collar 11 to move with the lever 15. It will be clearly seen from the construction that lever 15 together with collar 11 will be free to rotate or swing horizontally in one direction, namely to the right in Fig. 2, while the movement or swing of lever 15 in the opposite direction, or to the left in Fig. 2, will result in the rotation of the shaft 6 by reason of the interlocking portions or teeth 10 and 13.

As collar 11 is free to move vertically, and drop into place through the action of gravity, it permits of a new hold or bite being taken with each alternate stroke or oscillation of the lever, so that lever 15 may be oscillated in a horizontal direction instead of being moved in a complete circle about the shaft.

In order to maintain the relative position of the parts, that is to prevent the upward removal of sleeve 7 and collar 11, we provide the cover or cup shaped top member 17, which is adapted to fit over the upper part of collar 11, being provided with a central opening to receive the screw threaded end or shank $6^a$ of shaft or staff 6, which shank or screw threaded end receives the nut 18, whereby the parts are maintained in place.

Of course, the top or cover 17 need not necessarily be of the shape shown and described, as an annular plate or disk secured in place on top of the sleeve 7 by means of the nut 18 would be sufficient; although the cover shown and described tends to prevent the sliding connection between collar 11 and the upper portion of sleeve 7 being affected by the weather.

The operation of the mechanism is as follows: When it is desired to rotate the shaft 6 and apply the brakes, the lever 15 is lifted into the horizontal position shown in Fig. 2, thereby moving the projections or lugs 16 of the lever into the position more clearly shown in Fig. 5, thus allowing the collar 11 to move downward through the action of gravity and bringing its engaging surfaces or teeth into engagement with the engaging surfaces or teeth of the sleeve 7. The lever will afford great leverage in the act of applying the brakes and the yielding connection, between the two members 7 and 11, maintained through the action of gravity, permits the engaging portion or teeth of member 11 to ride over the engaging portions or teeth of the other member or sleeve 7 during one stroke in the oscillation of the lever, while the shaft will be rotated during the other stroke in the oscillation of lever 15. After the brakes have been applied and the lever 15 is released, the latter will swing downward into the position shown in Fig. 1, namely into a position substantially parallel with the shaft and out of the way of objects that may pass or are being passed by the car on which the mechanism is located. The downward movement or dropping of the lever will automatically produce an inoperative relation between the parts of the mechanism by reason of the fact that the portions or lugs 16 will be moved into a position substantially at right angles to the position shown in Figs. 2 and 3, thereby bringing the ends of lugs or portions 16 into contact with the upper surface or the wall of the cut-out portions 14 in the collar 11 and thereby move collar 11 upward into the position shown in Fig. 1 where the engaging surfaces of members 7 and 11 are out of contact with each other.

We have illustrated our improved mechanism as more especially adapted for use in the operation of a brake shaft, but it is apparent that the mechanism may be employed in other connections; and furthermore, the mechanism may be altered in a number of minor details without departing from the spirit of our invention.

What we claim is:—

1. Shaft operating mechanism, comprising a pair of members provided with interlocking surfaces, one of said members being fixedly secured to the shaft to be rotated, while the other member is slidably mounted on said first member and arranged to automatically move into engaging relation with the first member, and a lever loosely mounted on the first member and in operative engagement with the slidably mounted member whereby the position of the latter is controlled by the position of the lever.

2. Shaft operating mechanism, comprising a member fixedly secured to the staff or the shaft to be rotated, the member being provided with a flange at its lower end and provided with engaging surfaces intermediate of the flange and the opposite end of said member, a second member slidably mounted on the upper end of said first member and provided with surfaces adapted to interlock with the engaging surfaces on the first mentioned member, and a lever adapted to extend through the loosely mounted member and rest upon the flange of said first mentioned member and arranged to control the relation between said members.

3. The combination of a staff or shaft having a ratchet mounted thereon and provided with a flange below said ratchet, a member slidably mounted on said shaft above said ratchet and provided with surfaces adapted to engage with the ratchet when moved in one direction, and a drop handle or lever loosely mounted on the flange so as to permit it to rotate thereon during operation of said shaft or staff, the handle or lever being loosely held in place on the flange by said member.

4. Shaft operating mechanism, comprising a flanged member fixedly secured to the shaft to be rotated, said member being provided with engaging surfaces above the flanged portion thereof, a second member loosely mounted on the flanged member and provided with engaging surfaces adapted to interlock with the engaging surfaces of the flanged member, said second member being provided with openings in the side walls thereof and adapted to move lengthwise of the shaft, and a bifurcated lever provided with inwardly presented ends adapted to extend through the openings in the second member and rest upon the flanged portion of the first mentioned member, said inwardly presented portions being so arranged that the engaging surfaces of the two members will interlock when the lever is swung into operative position.

5. Shaft operating mechanism, comprising a cylindrical member provided with a flange at the one end thereof and adapted to be fixedly secured to the shaft or staff to be rotated, said member being provided with upwardly presented engaging surfaces at a point intermediate of the ends of said member, a second member adapted to receive the cylindrical member and provided with internally arranged engaging surfaces adapted to interlock with the upwardly presented surfaces of the cylindrical member, said second member being provided with diametrically opposite openings, a lever having a bifurcated end, the ends of the bifurcations being presented toward each other and adapted to extend through the openings of the second member and rest on the flange of the first member whereby the relative position of the two members may be affected.

6. Shaft operating mechanism, comprising a ratchet member adapted to be fixedly secured to the staff or shaft to be rotated, said ratchet member being provided with an annular flange at a point beneath the ratchet portion thereof and with a cylindrical portion above the ratchet portion, a second member adapted to fit over the ratchet member and provided with an internally arranged ratchet adapted to interlock with said ratchet member, and a lever arranged to drop into a position parallel with the shaft to be rotated, the end of the lever being adapted to rest on the annular flange of the ratchet member and be held in place by the second member.

7. Shaft operating mechanism, comprising a pair of concentrically arranged ratchet members, one of which is fixedly secured to the shaft or staff to be rotated while the other is adapted to have movement lengthwise of the shaft, and a lever adapted to extend through the wall of the outer member and loosely mounted on the inner member so as to permit the lever to drop in a position substantially parallel with the shaft to be rotated and move the outer member out of engagement with the inner member.

8. Shaft operating mechanism, comprising a pair of concentrically arranged ratchet members, the inner member being adapted to be fixedly secured to the shaft or staff to be rotated and provided with an annular flange, the outer member being provided with openings in the side wall thereof, and a bifurcated lever having elongated lugs or portions at the free ends of the bifurcations presented toward each other, the lugs or portions being adapted to extend through the openings in the outer member and rest on the annular flange of the inner member so that the lever is free to drop into a position substantially parallel with the shaft to be rotated and thereby move the outer member out of engagement with the inner member.

9. Shaft operating mechanism, comprising a pair of concentric members, the inner member being adapted to be secured to the shaft or staff to be rotated and provided with an annular flange at one end and with circumferentially arranged engaging surfaces or teeth above the flange, the outer member having a reduced portion provided with internally circumferentially arranged engaging surfaces or teeth and with openings in the lower end of said outer member, said outer member being free to rotate on the inner member, and a gravity controlled lever having portions extending through the openings in said outer member, and bearing upon the flange of said inner member, said lever being free to revolve about said inner member when the engaging surfaces of the concentric members are out of engagement.

10. Shaft operating mechanism, comprising a member adapted to be secured to the shaft or rod to be rotated, said member being provided with engaging surfaces, a second member adapted to encircle the first member and provided with engaging surfaces arranged to interlock with the engaging surfaces of the first mentioned member, and a lever loosely mounted on the first mentioned member, and held in place by the second member so as to be free to drop into an inoperative position substantially parallel with the shaft to be rotated, said lever being arranged to control the position of the second mentioned member.

11. Shaft operating mechanism, comprising a pair of ratchet members of different diameter, the one member being adapted to be secured to the shaft to be rotated while the other member is adapted to move lengthwise of the shaft and into and out of engagement with the first mentioned member, and a gravity controlled bifurcated lever provided with elongated portions adapted to control the movement of the second mentioned member.

12. Shaft operating mechanism, comprising a pair of concentric members having engaging surfaces, the one member being adapted to be fixedly secured to the shaft to be rotated while the other or outer member is free to move lengthwise of the first mentioned or inner member and in one direction circumferentially, and a lever loosely mounted on the inner member and arranged to control the longitudinal and circumferential movements of the outer member whereby movement of the lever in one direction will bring the engaging surfaces into interlocking position.

13. Shaft operating mechanism, comprising a member fixedly connected to the shaft, a second member movably mounted about the first member, an operating lever loosely secured between the first and second members, and means for retaining the parts in their respective positions.

14. Shaft operating mechanism, comprising a member fixedly mounted on the shaft to be operated, an operating lever loosely mounted on said member, a second member loosely mounted upon said operating lever, and means for holding the parts together.

15. Shaft operating mechanism, comprising a member fixedly mounted on the shaft to be operated, a lever loosely mounted on said member so as to occupy a position parallel with the shaft and one substantially at right angles thereto, a second member loosely mounted on said lever and adapted to form operative engagement with the first member when the lever is in a position substantially at right angles to the shaft, and means for maintaining the proper relation between said parts.

16. Shaft operating mechanism, comprising a member fixedly mounted on the shaft to be operated, a second member loosely mounted on said first member, and a lever arranged to occupy a position parallel with the shaft and one substantially at right angles thereto, said lever having one or more portions extending intermediate of the two members and arranged to control the relation of the members to each other.

17. A device of the class described, comprising a brake staff, ratchet members upon said staff, and a lever provided with a bifurcated end loosely engaging said members at substantially diametrically opposite points and free to swing into either a horizontal position or a vertical position, the engaging ends of the lever being so formed that movement of the lever into either one of said positions will control the operative relation between said ratchet members.

JOHN O. NEIKIRK.
ALFRED G. BANCROFT.

Witnesses:
H. E. GRESHAM,
G. F. McHUGH.

Copies of this patent may be obtained for five cents each, by addressing the "Commissioner of Patents, Washington, D. C."